United States Patent
Qian et al.

(10) Patent No.: US 9,706,437 B2
(45) Date of Patent: Jul. 11, 2017

(54) METHOD OF DIRECTED UE RELOCATION WITHIN AN MME/SGSN FLEX POOL

(71) Applicant: Affirmed Networks Communications Technologies, Inc., Acton, MA (US)

(72) Inventors: Haibo Qian, Plano, TX (US); Paul Boudreaux, Plano, TX (US); Fred Rink, Fairview, TX (US); Michael Brown, McKinney, TX (US)

(73) Assignee: AFFIRMED NETWORKS COMMUNICATIONS TECHNOLOGIES, INC, Acton, MA (US)

( * ) Notice: Subject to any disclaimer, the term of this patent is extended or adjusted under 35 U.S.C. 154(b) by 51 days.

(21) Appl. No.: 14/491,100

(22) Filed: Sep. 19, 2014

(65) Prior Publication Data

US 2016/0088518 A1    Mar. 24, 2016

(51) Int. Cl.
  *H04W 28/08* (2009.01)
  *H04W 8/26* (2009.01)
  *H04W 72/00* (2009.01)

(52) U.S. Cl.
  CPC ............ *H04W 28/08* (2013.01); *H04W 8/26* (2013.01); *H04W 72/00* (2013.01)

(58) Field of Classification Search
  CPC ..... H04W 8/08; H04W 28/08; H04W 60/005; H04W 36/0005; H04W 8/26; H04W 36/0011; H04W 40/02; H04L 45/00; H04L 61/6059; H04L 69/16; H04L 69/168
  See application file for complete search history.

(56) References Cited

U.S. PATENT DOCUMENTS

| | | | | |
|---|---|---|---|---|
| 8,477,730 | B2* | 7/2013 | Rajagopalan | H04W 36/22 370/331 |
| 8,509,200 | B2* | 8/2013 | Li | H04L 12/5695 370/338 |
| 8,855,051 | B2* | 10/2014 | Suh | H04W 48/16 370/328 |
| 9,185,595 | B2* | 11/2015 | Qu | H04W 8/065 |
| 9,294,981 | B2* | 3/2016 | Rajagopalan | H04W 36/22 |

(Continued)

OTHER PUBLICATIONS

3rd Generation Partnership Project;Technical Specification Group Services and System Aspects; Intra-domain connection of Radio Access Network (RAN) nodes to multiple Core Network (CN) nodes: 3GPP TS 23.236 V12.0.0 (Jun. 2013).

(Continued)

*Primary Examiner* — Brian O'Connor
(74) *Attorney, Agent, or Firm* — Wilmer Cutler Pickering Hale and Dorr LLP

(57) ABSTRACT

Example implementations described herein are directed to a support node apparatus configured to support a wireless network system. The support node apparatus can be in the form of a mobility management entity and/or a serving general packet radio service. The example implementations directed herein can provide a network resource identifier and/or a globally unique temporary identifier to an associated user equipment to facilitate the transfer of the user equipment from a source support node apparatus to a target support node apparatus. In example implementations, the target support node apparatus can thereby be directly specified by use of the identifier.

18 Claims, 15 Drawing Sheets

(56) References Cited

U.S. PATENT DOCUMENTS

| | | | | |
|---|---|---|---|---|
| 2011/0269499 A1* | 11/2011 | Vikberg | ............... | H04W 28/08 |
| | | | | 455/524 |
| 2012/0282937 A1* | 11/2012 | He | .......... | H04W 8/26 |
| | | | | 455/450 |
| 2014/0133464 A1* | 5/2014 | Li | ............. | H04L 12/5695 |
| | | | | 370/331 |
| 2014/0160938 A1* | 6/2014 | Qu | ............ | H04W 8/065 |
| | | | | 370/236 |
| 2014/0221025 A1* | 8/2014 | Chandramouli | ........ | H04W 8/08 |
| | | | | 455/458 |
| 2015/0050924 A1* | 2/2015 | Gotou | ............. | H04W 8/18 |
| | | | | 455/418 |
| 2015/0215768 A1* | 7/2015 | Dong | ............. | H04W 8/06 |
| | | | | 370/328 |
| 2015/0334615 A1* | 11/2015 | Zhang | ............. | H04W 36/04 |
| | | | | 370/331 |
| 2016/0029278 A1* | 1/2016 | Poikonen | ............ | H04W 36/12 |
| | | | | 370/331 |

OTHER PUBLICATIONS

3GPP TS 23.236 v13.0.0, "3rd Generation Partnership Project; Technical Specification Group Services and System Aspects; Intra-domain connection of Radio Access Network (RAN) nodes to multiple Core Network (CN) nodes (Release 13)", 3GPP Organizational Partners, Valbonne, France, 2015 (41 pages).

3GPP TS 23.401 V13.9.0, "3rd Generation Partnership Project; Technical Specification Group Services and System Aspects; General Packet Radio Service (GPRS) enhancements for Evolved Universal Terrestrial Radio Access Network (E-UTRAN) access (Release 13)", 3GPP Organizational Partners, Valbonne, France, 2016 (374 pages).

* cited by examiner

| Sequence number range | Source SGSN network resource identifier |
|---|---|
| range 1: $a_{11}, a_{12},..., a_{1M}$ | Source SGSN NRI value 1 |
| range 2: $a_{21}, a_{22},..., a_{2M}$ | Source SGSN NRI value 2 |
| ... | ... |
| Range N: $a_{N1}, a_{N2},..., a_{NM}$ | Source SGSN NRI value N |

FIG. 11(a)

| M-TMSI number range | Source MME MME code |
|---|---|
| range 1: $a_{11}, a_{12}, ..., a_{1M}$ | Source MME MME code 1 |
| range 2: $a_{21}, a_{22}, ..., a_{2M}$ | Source MME MME code 2 |
| ... | ... |
| Range N: $a_{N1}, a_{N2}, ..., a_{NM}$ | Source MME MME code N |

FIG. 11(b)

| Core Node Identifier (NRI in the case of GPRS/UMTs) | SGSN linked to the Identifier |
|---|---|
| 1 | SGSN 1 |
| 2 | SGSN 2 |
| 3 | SGSN 3 |

FIG. 12(a)

| Core Node Identifier (MME Code in the case of LTE) | MME linked to the Identifier |
|---|---|
| 6 | MME 1 |
| 7 | MME 2 |
| 8 | MME 3 |

METHOD OF DIRECTED UE RELOCATION WITHIN AN MME/SGSN FLEX POOL

BACKGROUND

Field

The present disclosure relates generally to support node apparatuses in wireless network systems such as Third Generation Partnership Project (3GPP) systems, and more specifically, to user equipment (UE) relocation within a pool of support node apparatuses, such as a Mobility Management Entity (MME) or Serving General packet radio service Support Node (SGSN) pool.

Related Art

3GPP Specification TS 23.236 defines the concept of SGSN and MME pooling to support a common set of radio access network (RAN) nodes by a group of SGSNs (in a General Packet Radio Service (GPRS)/Universal Mobile Telecommunications System (UMTS) network) or a group of MMEs (in a Long Term Evolution (LTE) network).

The above-noted specification also defines a way to offload User Equipment from one SGSN or MME to other SGSNs or MMEs in the pool. A limitation of the 3GPP defined solution is that the operator cannot control a target SGSN or MME in the pool to which the UEs are migrated during the offload.

SUMMARY

Example implementations described herein may address the limitation in 3GPP by allowing the operator to specify the destination node in the pool to which the UE(s) is migrated. In example implementations, the directional offload may be implemented without introduction of any new inter-nodal messages.

Aspects of the present application may include a support node apparatus configured to support a wireless network system. The apparatus may include a memory configured to store management information indicative of a relationship between one or more identifiers and one or more other support node apparatuses in the wireless network system, the one or more identifiers being in the form of one of a network resource identifier and a globally unique temporary identifier; and a processor configured to select a target support node apparatus from the one or more other support node apparatuses in the wireless network system for a user equipment; retrieve a target identifier from the one or more identifiers for the target support node apparatus based on the management information; and associate the user equipment with the target identifier.

Aspects of the present application may include a method for a support node apparatus configured to support a wireless network system. The method may include managing management information indicative of a relationship between one or more identifiers and one or more other support node apparatuses in the wireless network system, the one or more identifiers being in the form of one of a network resource identifier and a globally unique temporary identifier; selecting a target support node apparatus from the one or more other support node apparatuses in the wireless network system for a user equipment; retrieving a target identifier from the one or more identifiers for the target support node based on the management information; and associating the user equipment with the target identifier.

Aspects of the example implementations further include a wireless network system, which can include one or more radio access networks configured to handle one or more associated user equipment; and one or more support node apparatuses. Each of the one or more support node apparatuses may include a memory configured to store management information indicative of a relationship between one or more identifiers and the one or more other support node apparatuses in the wireless network system, the one or more identifiers being in the form of one of a network resource identifier and a globally unique temporary identifier; and a processor configured to select a target support node apparatus from the one or more other support node apparatuses in the wireless network system for a user equipment from the one or more associated user equipment; retrieve a target identifier from the one or more identifiers for the target support node apparatus based on the management information; and associate the user equipment with the target identifier.

BRIEF DESCRIPTION OF DRAWINGS

FIGS. 11(a) and 11(b) illustrate examples of target node offload information, in accordance with an example implementation.

FIGS. 12(a) and 12(b) illustrate an example of core Node ID Management 905-1, in accordance with an example implementation.

DETAILED DESCRIPTION

Figure 1:
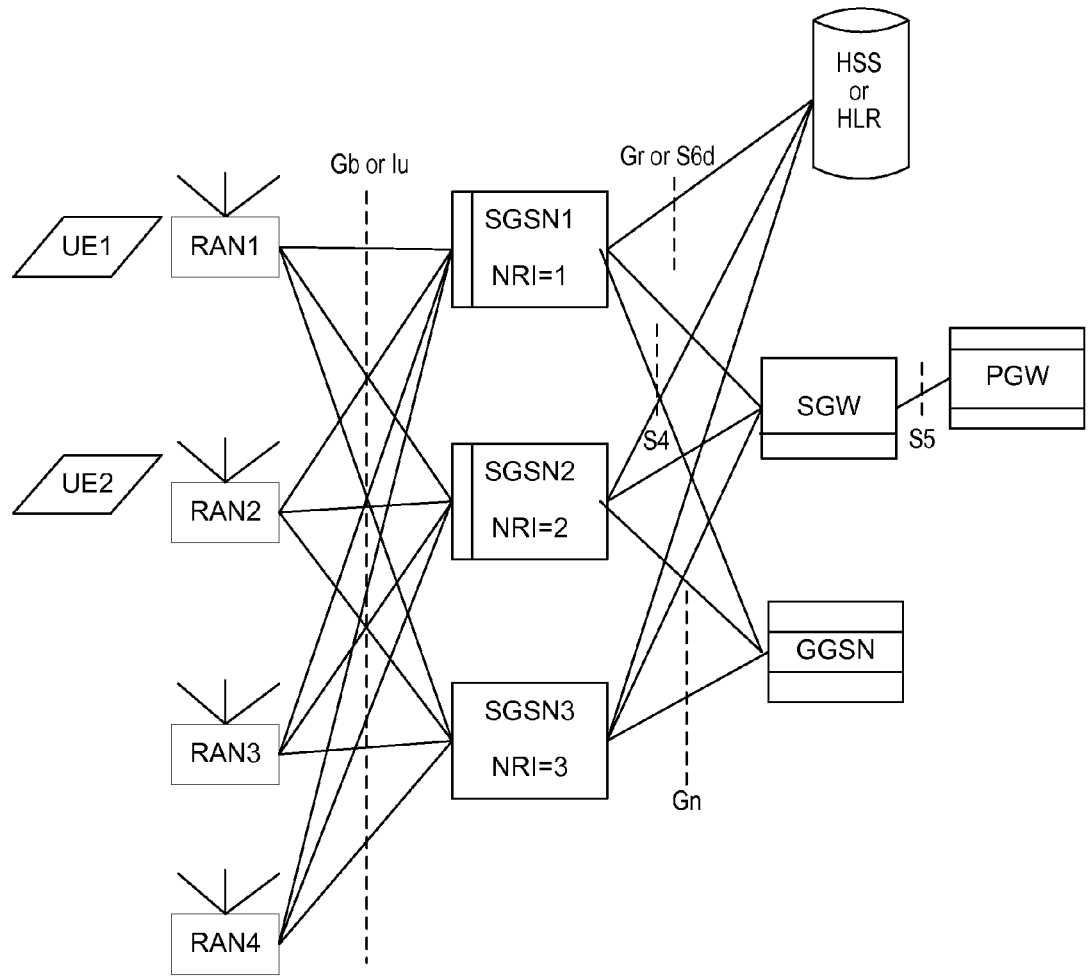
FIG. 1 illustrates a GSM/UMTS wireless packet network, in accordance with an example implementation.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application.

The terms enhanced node B (eNodeB) shall apply to macro cell, small cell and pico cell throughout the example implementations. The terms traffic and data may also be utilized interchangeably throughout the example implementations. Support node apparatus may be generally used to refer to support nodes in a wireless network, such as a MME or a SGSN or a combination thereof, depending on the desired implementation. The implementations described herein are also not intended to be limiting, and can be implemented in various ways, depending on the desired implementation.

Example implementations apply to the SGSN and the MME in the wireless packet networks. The SGSN applies to the Global System for Mobile (GSM) and UMTS networks and the MME applies to the LTE networks. Multiple SGSN nodes or multiple MME nodes can be pooled to support the common radio access network.

Example implementations of the present disclosure may be used for a commercial SGSN, MME or a combined MME/SGSN. This may enhance the value of the SGSN/MME for the operators and can afford the operator better control of how load-balancing is achieved.

Example use cases of the example implementations of the present disclosure can include the following, but are not limited thereto.

Ability for the operator to perform controlled testing of a given MME/SGSN in a pool using select UE(s): This can be useful when deploying a new node or when updating a new software load. The operator can add the new node or update the software based on an existing node. Prior to making the software generally available for all UEs, the operator can directionally move specific test UEs to that node for specific testing.

Capacity rebalancing: When a new MME or SGSN is added to a pool or the capacity of given node is expanded, the operator can use directional offload to move UEs from the existing pool nodes over to the new or expanded node.

Taking a node out of service. During a maintenance procedure that removed a node from the pool, the operator can choose to selectively decide to where the UEs shall be relocated.

Depending on the implementation of the wireless network, the SGSNs in a pool reserve a range of Packet Temporary Mobile Subscriber Identity (PTMSI) exclusively for directional offloading purpose. Similarly, the MMEs in a pool similarly reserve a range of Globally Unique Temporary Identity (GUTI) exclusively for directional offloading purpose. The reserved range is divided into N blocks, (N is the number of MMEs or SGSNs in a pool, wherein an example maximum is 256), each assigned to one MME or one SGSN.

When the directional offloading procedure is started, the source SGSN assigns PTMSIs from its reserved block along with the Network Resource Identifier (NRI) of the target SGSN to which the UEs are being migrated. After the signaling connection is released, the next message from the UE (e.g. Routing Area Update (RAU)) is directed to the target SGSN by the radio access network, which determines the destination SGSN based on the target identifier in the form of the NRI. The target SGSN, after receiving the Routing Area Update message from the UE, determines based on the PTMSI that the UE is being migrated from the source SGSN. The target SGSN can then perform an inter-SGSN RAU procedure to retrieve the mobile context from the source SGSN and finishes the migration. Once the UE is migrated, the target SGSN assigns a normal PTMSI to the UE in the RAU Accept message to the UE, so as to free up the PTMSI used for migration.

FIG. 1 illustrates a GSM/UMTS wireless packet network, in accordance with an example implementation. In the example illustrated in FIG. 1, there is pool of support node apparatuses in the form of an SGSN pool (SGSN1, SGSN2, SGSN3), communicatively coupled to the radio access networks (RAN1, RAN2, RAN3, RAN4) which interact with user equipment (UE1, UE2). Various interfaces that can facilitate communication in the network. For example, the Gb interface is the communication channel between the GSM/GPRS base station subsystem and the SGSN and the Iu interface is that between the UMTS Radio Access Network and the SGSN.

The serving gateway (SGW) routes and forwards user data packets, and may also function as a mobility anchor for the user plane during handovers and interacts with the SGSNs with the S4 interface. The packet data network gateway (PGW) is configured to conduct policy enforcement, packet filtering for each user, and packet screening functions. The PGW interacts with the SGW through the S5 interface. The Gateway GPRS Support Node (GGSN) is configured to handle communication between the GPRS network and external packet switched networks (e.g., internet) and interacts with the SGSN through the Gn interface. The Home Location Register/Home Subscriber Server (HLR/HSS) provides database management for the network and interacts with the SGSN via the Gr or S6d interface.

In an SGSN pool, each SGSN node is assigned a Network Resource Identity (NRI). When a UE attaches to the SGSN, the UE is assigned a PTMSI by the SGSN that contains the NRI of that SGSN. When the UE establishes a signaling link with the network, the radio access network uses the NRI to determine which SGSN shall receive the message. This ensures the message from the UE always goes to the assigned SGSN.

The 3GPP defined implementation to rebalance the loads within the SGSN pool is to use a NULL-NRI and a non-broadcast Routing Area Identifier (RAI). A NULL-NRI is a special NRI not assigned to any SGSN in the pool. When the UE receives a PTMSI with the NULL-NRI, the UE will attempt a RAU, which can be distributed by the radio access network to any SGSN in the pool. Thus, in the 3GPP implementation, the operator cannot specify the target SGSN.

Figure 2:
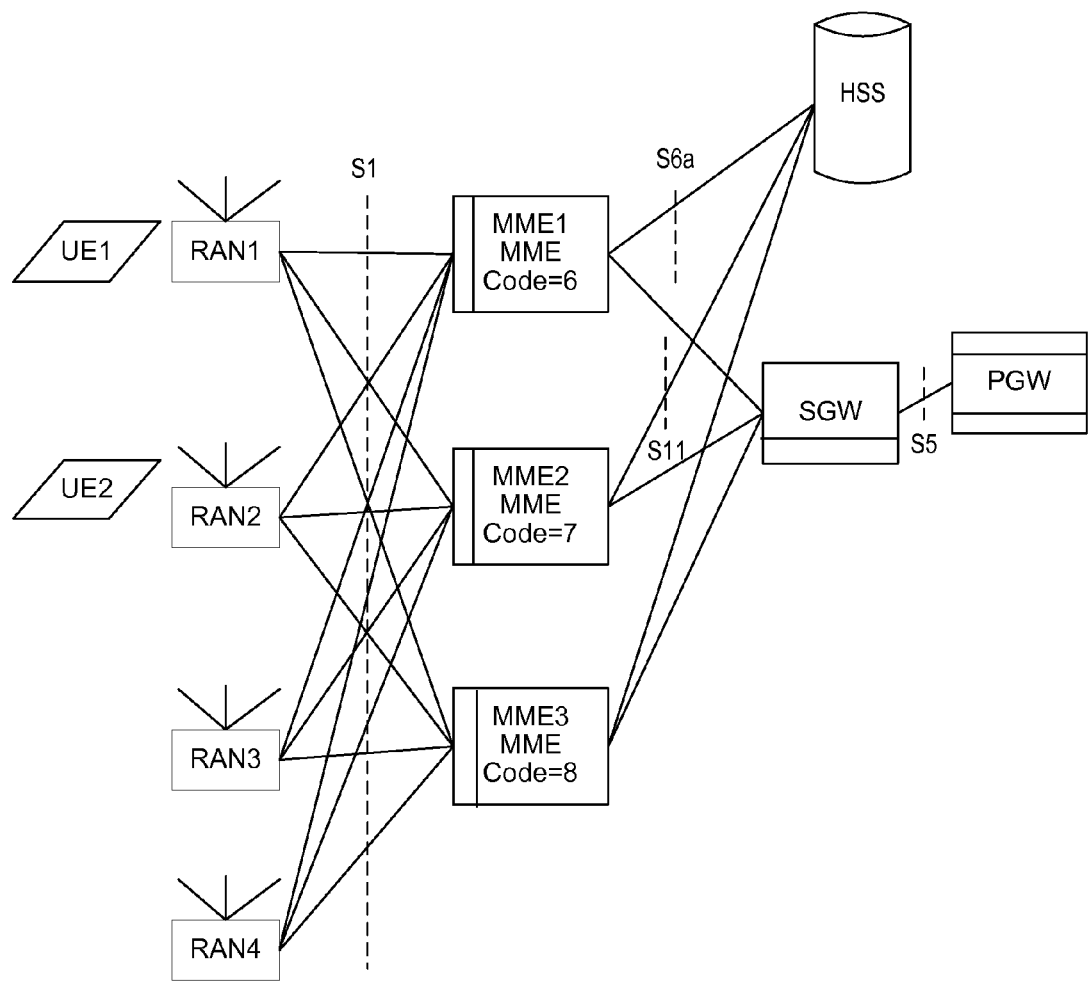
FIG. 2 illustrates an LTE wireless packet network, in accordance with an example implementation.

FIG. 2 illustrates an LTE wireless packet network, in accordance with an example implementation. In the example of FIG. 2, there is a pool of support node apparatuses in the form of an MME pool (MME1, MME2, MME3), which communicate with one or more radio access networks (RAN1, RAN2, RAN3, RAN4) through an S1 interface. Similar to the GSM/UMTS network, the serving gateway (SGW) routes and forwards user data packets, and may also function as a mobility anchor for the user plane during handovers and interacts with the MMEs with the S11 interface. The packet data network gateway (PGW) is configured to conduct policy enforcement, packet filtering for each user, and packet screening functions and interacts with the SGW through the S5 interface.

The source MME assigns GUTI from its reserved block along with the MME code of the target MME to the UE being migrated. The next message from the UE (e.g., Tracking Area Update (TAU)) is directed to the target MME by the radio access network, which determines the destination based on the MME code. The target MME determines based on the GUTI that the UE is being migrated from the source MME, and then initiates normal inter-MME TAU procedure to retrieve the mobile context information from the source MME and finishes the migration. Once the UE is migrated, the target MME assigns a normal GUTI to the UE in the TAU Accept message to the UE, which frees up the GUTI used for migration.

In an MME pool each MME node is assigned an MME code. The MME assigns a GUTI that includes its MME code as part of the identifier to the UE. When the UE establishes signaling link with the network, the radio access network uses the MME code found in the GUTI to determine which MME shall receive the message. This ensures the message from the UE always goes to the correct MME.

For the LTE network, the 3GPP defined implementation is to use a special S1 interface cause when performing a load balance between nodes in the same pool. The special S1 interface cause is "Load Balancing TAU Required". This cause forces the RAN to select a different MME based on its own load-balancing algorithm to forward the ensuing TAU message from the UE. Thus, the operator cannot specify the target MME.

Directional UE Migration

Figure 3A:
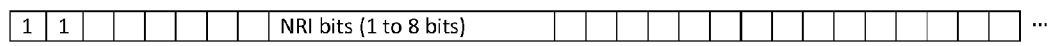
FIG. 3(a) illustrates an example PTMSI, in accordance with an example implementation.

FIG. 3(a) illustrates an example composition of a PTMSI, in accordance with an example implementation. As illustrated in FIG. 3(a), the PTMSI is the temporary identifier the SGSN assigns to the UE. It is a 32-bit number subdivided into a NRI region and a sequence number region. The top two bits may be set to 1 as illustrated, wherein the remaining bits forms the NRI region and sequence number of the PTMSI. Example implementations of the present disclosure utilize a range from the sequence number region. The region is created based on the number of NRIs in use in the pool (N) and how many simultaneous UEs can be moved from one SGSN at a time (M). As an example, numbers $a_{11}$ to $a_{NM}$ can be reserved for a pool with N NRIs. The reserved range is further divided into N different blocks: $a_{11} \ldots a_{1M}, a_{21} \ldots a_{2M}, \ldots, a_{N1} \ldots a_{NM}$. Each block is used by the owner of the corresponding NRI number. E.g. if a SGSN has NRI 1, it would only use block $a_{11} \ldots a_{1M}$. If the SGSNs in the pool have different capacities, different values of M can be used for different SGSNs. The SGSNs in the pool do not use the reserved range during normal mobility management procedures. Instead, the reserved range is only used during directional UE migration from the source SGSN to a target SGSN.

Figure 3B:
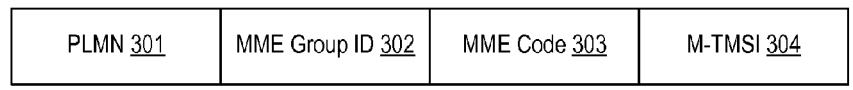
FIG. 3(b) illustrates an example GUTI, in accordance with an example implementation.

FIG. 3(b) illustrates the composition of a GUTI, in accordance with an example implementation. GUTI is the temporary identifier the MME assigns to the UE. The GUTI has two main parts, Global Unique MME Identifier (GUMMEI) which identifies the MME that allocated the GUTI, and the which M-MTMSI identifies the UE within the MME. As illustrated in FIG. 3(b), the GUTI is composed of the Public Land Mobile Network (PLMN) identifier 301, MME group identifier 302, MME code 303 and an M-TMSI (M-Temporary Mobile Subscriber Identity) 304. The GUMMEI is composed of the PLMN, MME Group identifier and the MME Code. The M-TMSI is also a 32-bit number, but without the additional division compared to the PTMSI. Similarly to the PTMSI case, example implementations of the present disclosure utilize a range from the M-TMSI. The range reserved can be determined by the number of MME codes used in the pool (N) and how many simultaneous UEs can be moved from one MME at a time (M). As an example, numbers $a_{11}$ to $a_{NM}$ can be reserved for a pool with N MME codes in use. The reserved range is further divided into N different blocks: $a_{11} \ldots a_{1M}, a_{21} \ldots a_{2M}, \ldots, a_{N1} \ldots a_{NM}$. Each block is used by the owner of the corresponding MME code number. E.g. if an MME has MME code 2, it would only use block $a_{21} \ldots a_{2M}$. If the MMEs in the pool have different capacities, different value of M can be used for different MMEs. The MMEs in the pool do not use the reserved range during normal mobility management procedures. Instead, the reserved range is only used during directional UE migration from the source MME to a target MME.

Figure 4:
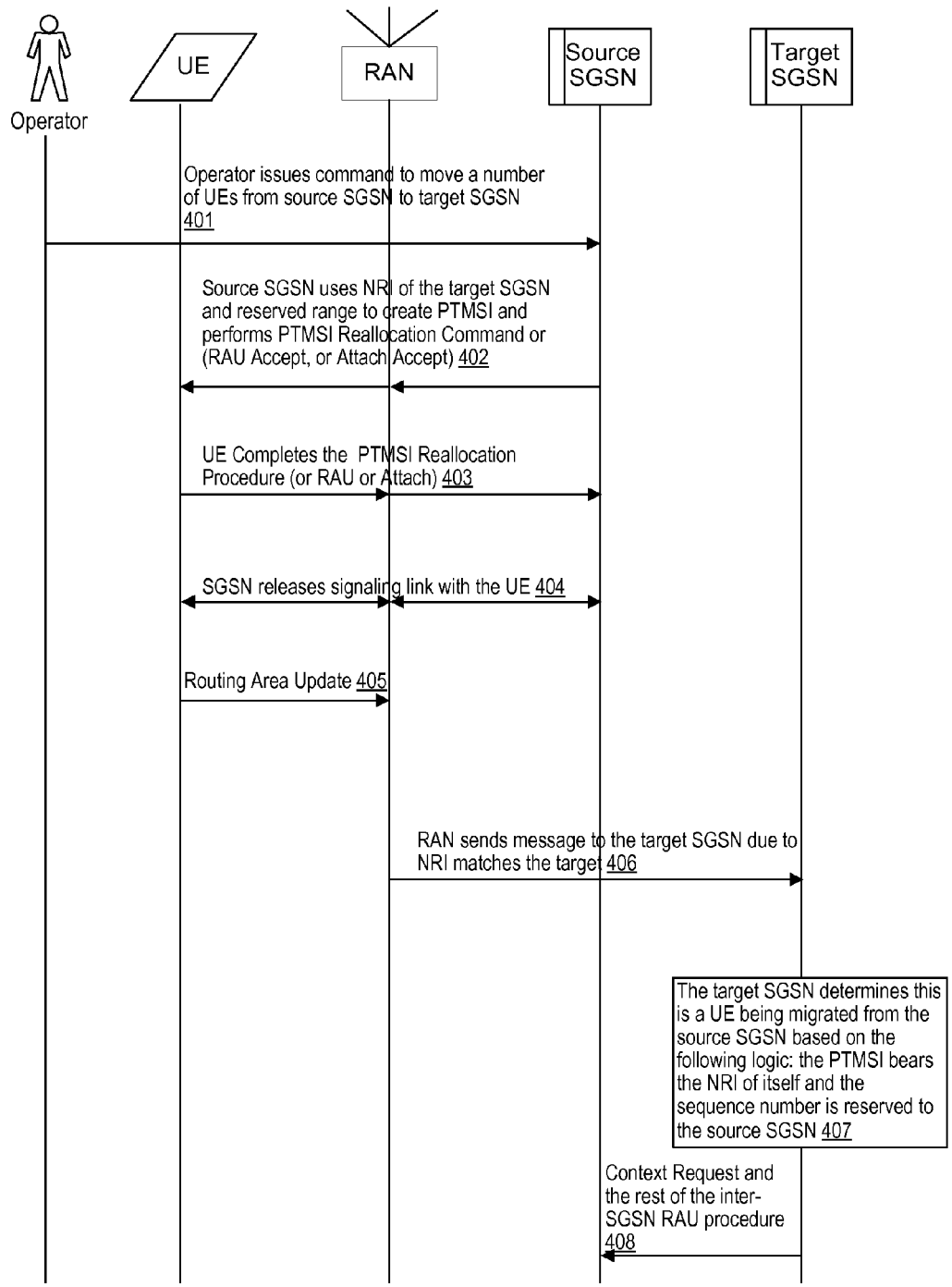
FIG. 4 illustrates a flow diagram for a GSM/UTMS network, in accordance with an example implementation.

FIG. 4 illustrates a flow diagram for a GSM/UTMS network, in accordance with an example implementation. Example implementations can involve the following flow to achieve directional UE migration from the source SGSN to a target SGSN. The flow can be initiated, for example, when an operator issues command to move a number of UEs from source SGSN to target SGSN as shown at 401.

At 402, the source SGSN assigns a PTMSI with the NRI of the target (instead of its own) and a sequence number from its reserved block.

At 403, the source SGSN also assigns a non-broadcast RAI to the UE. The new PTMSI and non-broadcast RAI can be sent to the UE via a PTMSI Reallocation Command, Routing Area Update Accept, or Attach Accept message depending on the state of the UE.

At 404, the source SGSN releases the signaling link to the UE. At 405, the UE detects that a new routing area update is required due to non-broadcast RAI does not match the RAI it receives over the air and performs a Routing Area Update using the PTMSI assigned in at the flow of 402.

At 406, the radio access network routes the message to the target SGSN based on the NRI used in the PTMSI.

At 407, the target SGSN determines the UE is migrating from another SGSN based on the PTMSI: the NRI belongs to the target SGSN and the sequence number is in the reserved range. It further determines the source SGSN based on the sequence number used.

At 408, the target SGSN then initiates a normal inter-SGSN Routing Area Update procedure by requesting the mobile context from the source SGSN. The target SGSN assigns a normal PTMSI to the UE in the RAU Accept message such that the PTMSI assigned by the source SGSN is freed.

Figure 5:
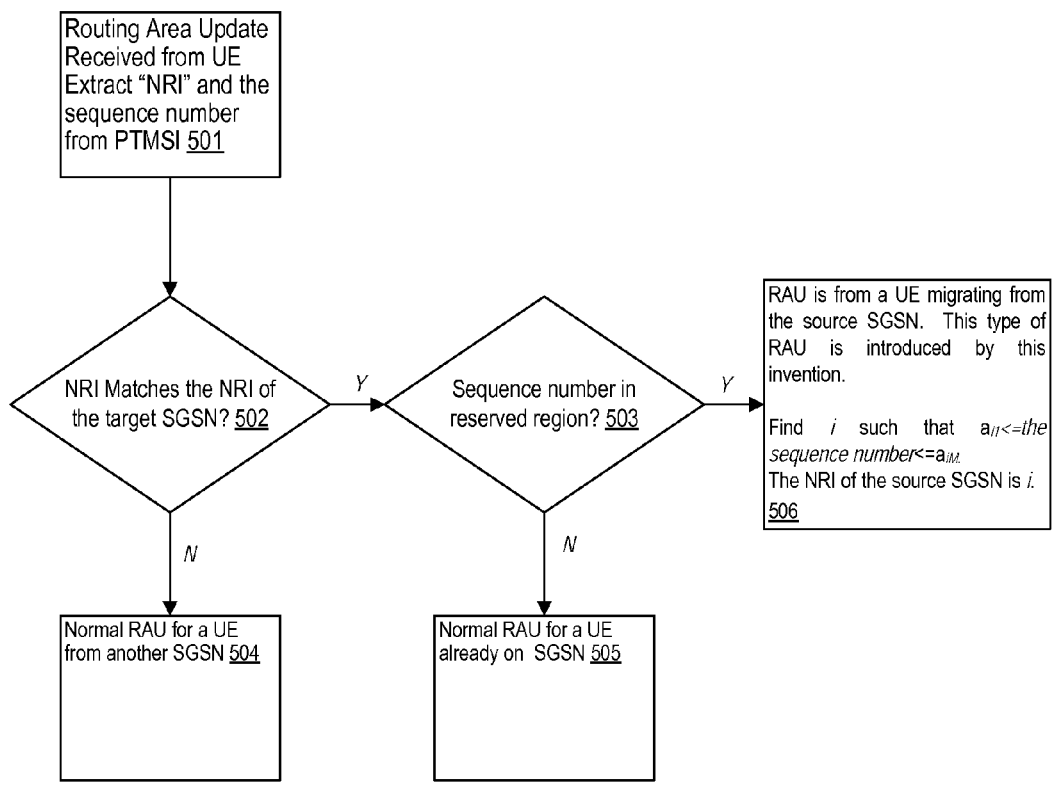
FIG. 5 illustrates the logic performed by the target SGSN in the flow at 407, in accordance with an example implementation.

FIG. 5 illustrates the logic performed by the target SGSN in the flow at 407, in accordance with an example implementation.

At 501, the target SGSN receives the RAU from the UE. The target SGSN extracts the "NRI" and the sequence number from the PTMSI. At 502, a check is performed to determine if the NRI matches the NRI of the target SGSN. If not (N), then the flow proceeds to 504, wherein the target SGSN interprets the RAU as a normal RAU for a UE from another SGSN and proceeds normally. Otherwise (Y), the flow proceeds to 503, wherein the target SGSN determines if the RAU contains a sequence number in the reserved region. If not (N), then the flow proceeds to 505, wherein the target SGSN interprets the RAU as a normal RAU for a UE already on SGSN. Otherwise (Y), the target SGSN determines that the RAU is from a UE migrating from the source SGSN, as introduced in the example implementations of the present disclosure. The target SGSN then finds i such that $a_{i1}<=$ the sequence number $<=a_{iM}$. . . . The target SGSN can determine NRI of the source SGSN from i.

Figure 6:
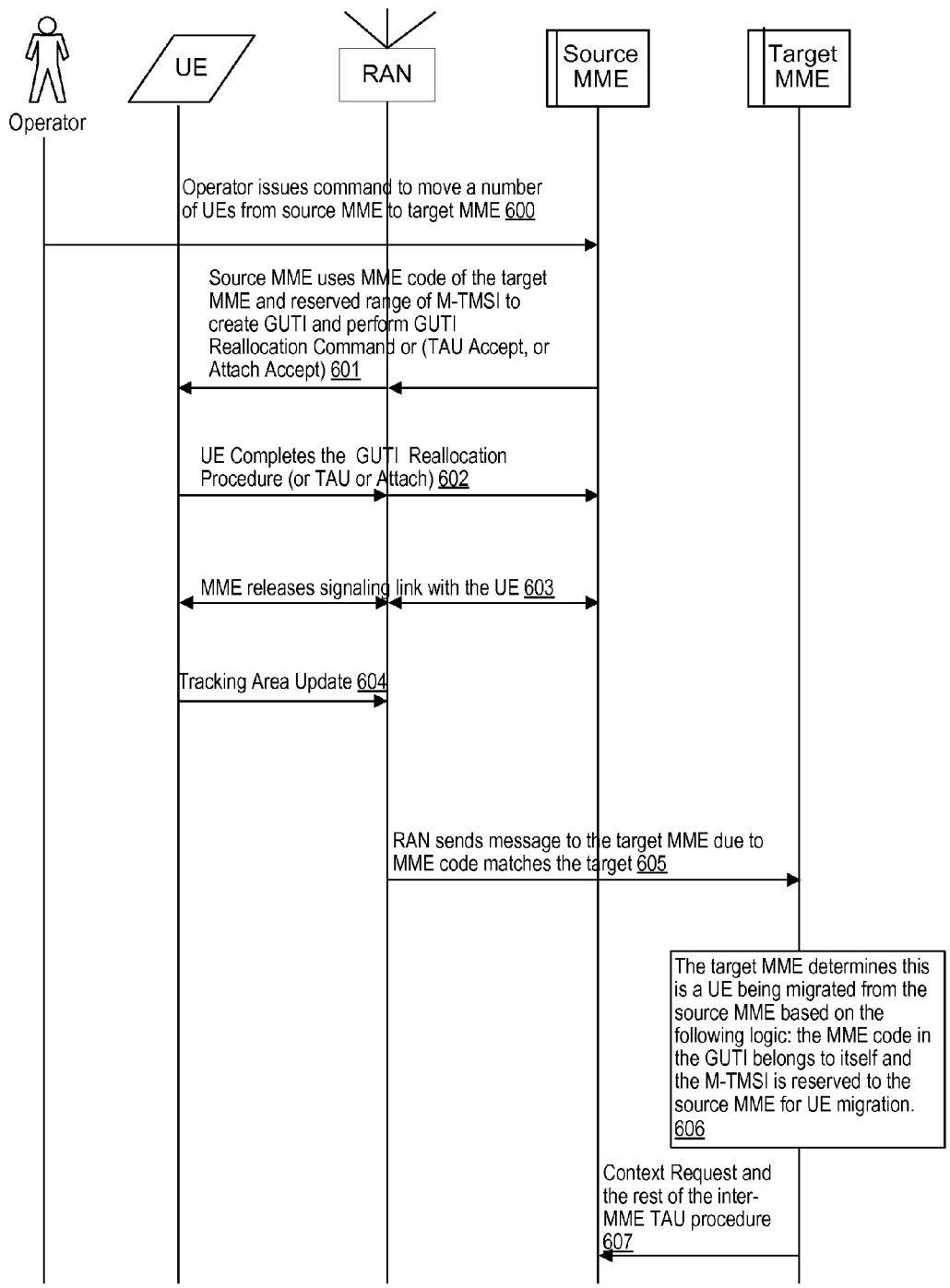
FIG. 6 illustrates a flow diagram for a LTE network, in accordance with an example implementation.

FIG. 6 illustrates a flow diagram for a LTE network, in accordance with an example implementation.

Similarly, in an LTE network, for the directional migration of UE from the source MME to target MME, example implementations of the present disclosure utilize the following flow. The flow begins at 600, wherein the operator issues a command to move a number of UEs from the source MME to the target MME.

At 601, the source MME assigns a GUTI with the MME code of the target (instead of its own) and an M-TMSI from its reserved block. The source MME uses the MME code of the target MME and reserved range of the M-TMSI to create the GUTI and performs the GUTI Reallocation Command or a TAU Accept, or an Attach Accept depending on the state of the UE. The MME also assigns a non-broadcast Tracking Area Identifier to the UE at the same time.

At 602, the UE completes the GUTI Reallocation Procedure (or TAU or Attach).

At 603, the source MME releases signaling link with the UE. The source MME releases the signaling link to the UE, with a normal cause. The cause "Load Balancing TAU Required" that triggers a non-directional migration of UE is not used.

At 604, the UE detects that a new tracking area update is required due to non-broadcast TAI does not match the TAI it receives over the air and performs Tracking Area Update using the GUTI assigned in 601.

At 605, the radio access network routes the message to the target MME based on the MME code used in the GUTI.

At 606, the target MME determines whether the UE is migrating from another MME based on the GUTI. In an example implementation, the target MME determines whether the MME code belongs to itself and the M-TMSI is in the reserved range. The target MME further determines the source MME based on the M-TMSI used.

At 607, the target MME then initiates a normal inter-MME Tracking Area Update procedure by requesting mobile context from the source MME. The target MME assigns a normal GUTI to the UE in the TAU Accept message such that the GUTI assigned by the source MME is freed.

Figure 7:
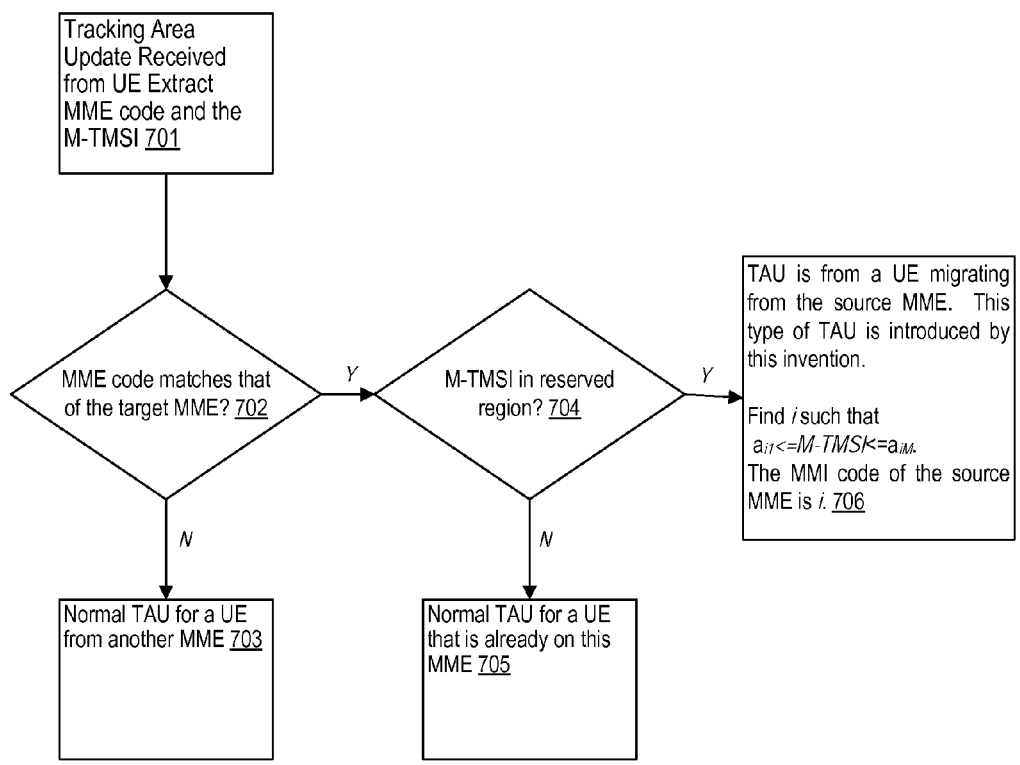
FIG. 7 illustrates the logic performed by the target MME in the flow at 606, in accordance with an example implementation.

FIG. 7 illustrates the logic performed by the target MME in the flow at 606, in accordance with an example implementation. At 701, the target MME receives a TAU from the UE. The target MME extracts the MME code and the M-TMSI. At 702, the target MME checks if the MME code matches that of the target MME. If so (Y), then the flow proceeds to 704. If not (N), then the flow proceeds to 703, wherein the target MME identifies the TAU as a normal TAU for a UE from another MME.

At 704, the target MME checks if the M-TMSI is in the reserved region. If so (Y), the flow proceeds to 706. If not (N), then the flow proceeds to 705, wherein the target MME processes the TAU as a normal TAU for a UE that is already on this MME.

At 706, the target MME determines that the TAU is from a UE migrating from the source MME. This type of TAU is as described in the above example implementations. The target MME then finds i such that $a_{i1} <= M\text{-}TMSR = a_{iM}$. The MME code of the source MME is i.

Figure 8:
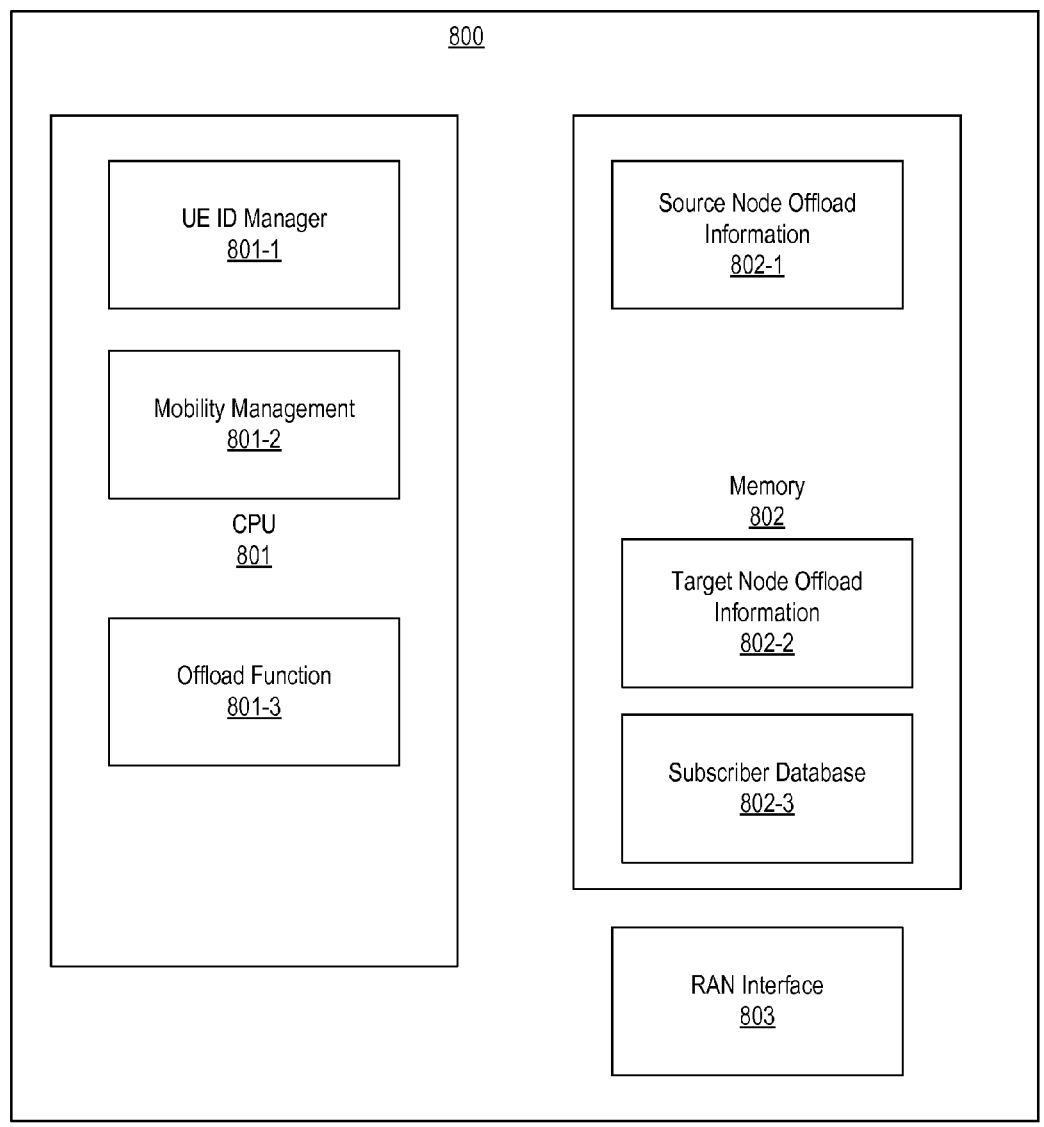
FIG. 8 illustrates an example diagram of a support node apparatus, in accordance with an example implementation.

FIG. 8 illustrates an example support node apparatus, in accordance with an example implementation. The support node apparatus may be in the form of a MME, a SGSN or a device configured to perform the functions of both, and implemented in the form of a server or computer depending on the desired implementation. The support node apparatus 800 may include a CPU 801, a memory 802 and a RAN interface 803. The CPU 801 may invoke one or more functions that facilitate the support node apparatus as a source support node apparatus handing a UE to a target support node apparatus, as well as a target support node apparatus receiving a UE from a source support node apparatus. The memory 802 may be configured to store information to manage functionality as a target support node apparatus and a source support node apparatus.

CPU 801 may include one or more functions such as UE ID manager 801-1, Mobility Management 801-2 and Offload Function 801-3. UE ID manager 801-1 may be configured to refer to Subscriber Database 802-3 in the memory 802 to manage UEs that are associated with the support node apparatus 800. Mobility Management 801-2 may utilize RAN interface 803 to communicate with the RAN and associated base station to process the receiving or transferring of UEs. Offload function 801-3 may be configured to receive a request to load balance the UEs associated with the RAN and refer to subscriber database 802-3 to determine UEs to offload. Offload function 801-3 may also be configured to receive a UE offloaded from another support node apparatus and update subscriber database 802-3 accordingly. Offload function 801-3 may refer to source node offload information 802-1 and target node offload information 802-2 for receiving or offloading a UE. Source node offload information 802-1 may be implemented in any manner known to one of ordinary skill in the art for associating UE statuses and identifiers with a target node selected by the operator.

Figure 9:
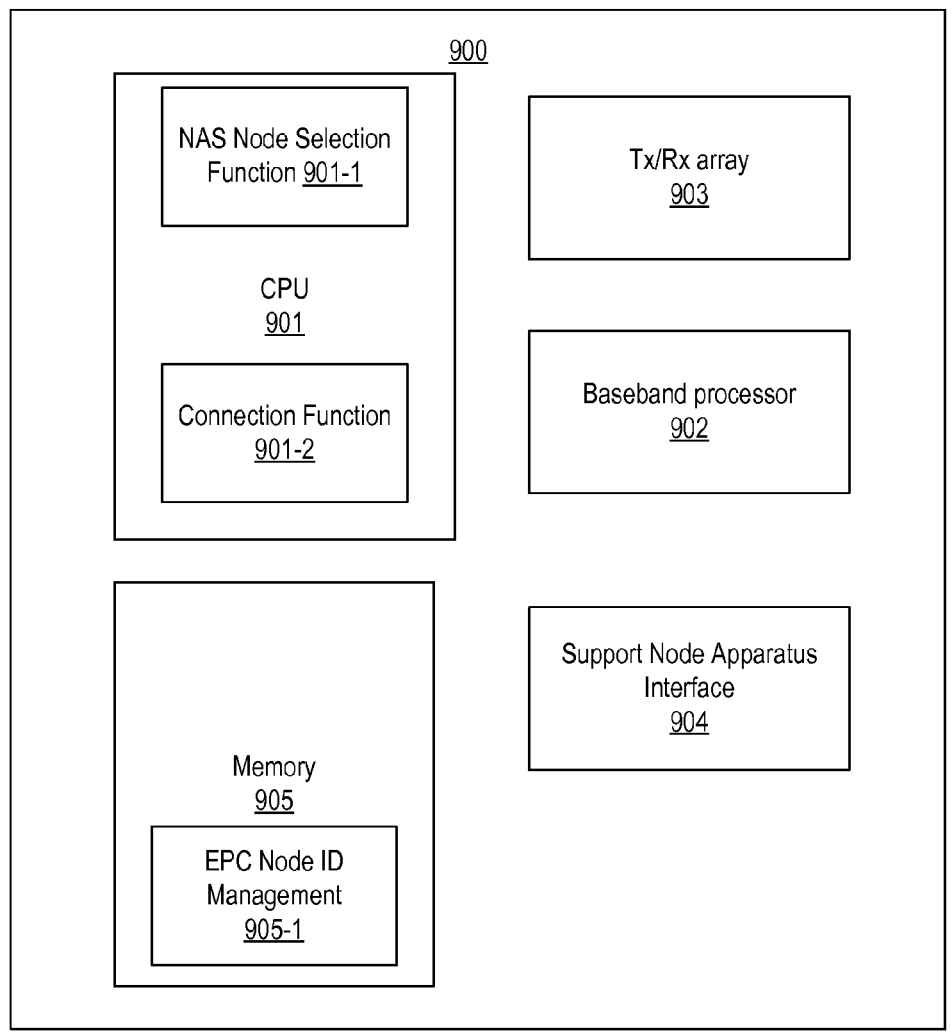
FIG. 9 illustrates an example implementation of a base station in a RAN, in accordance with an example implementation.

FIG. 9 illustrates an example implementation of a base station in a RAN, in accordance with an example implementation. The block diagram of a base station 900 in the example implementations is shown in FIG. 9, which can be a GSM/GPRS base station, a UMTS Radio Network Controller (RNC), an enhanced node B and so forth. The RAN 900 may include the following modules: the Central Processing Unit (CPU) 901, the baseband processor 902, the transmission/receiving (Tx/Rx) array 903, the support node apparatus interface 904, and the memory 905. The CPU 901 is configured to execute one or more modules or flows as described, for example, in FIGS. 4 and 6. The baseband processor 902 generates baseband signaling including the reference signal and the system information such as the cell-ID information. The Tx/Rx array 903 contains an array of antennas which are configured to facilitate communications with associated UEs. The antennas may be grouped to form one or more active antenna ports. Associated UEs may communicate with the Tx/Rx array to transmit RAU updates based on the PTMSI reallocation procedure, which can be utilized by the CPU 901 to transfer the UE from a source support node apparatus to a target support node apparatus. The support node apparatus interface 904 is an interface for communicating with one or more support node apparatuses, and can be implemented by using any hardware implementation known in the art.

The memory 905 can be configured to store and manage the UE feedback measurements of the associated UE and other management information. The memory 905 may include Core node ID management information 905-1 to maintain a mapping of core network node identifiers to the core node. Memory 905 may take the form of a computer readable storage medium or can be replaced with a computer readable signal medium as described below.

The CPU 901 may be configured to provide the function of the NAS node selection function 901-1 and connection function 901-2 which manages the connection state of the User Equipment (UE).

Figure 10:
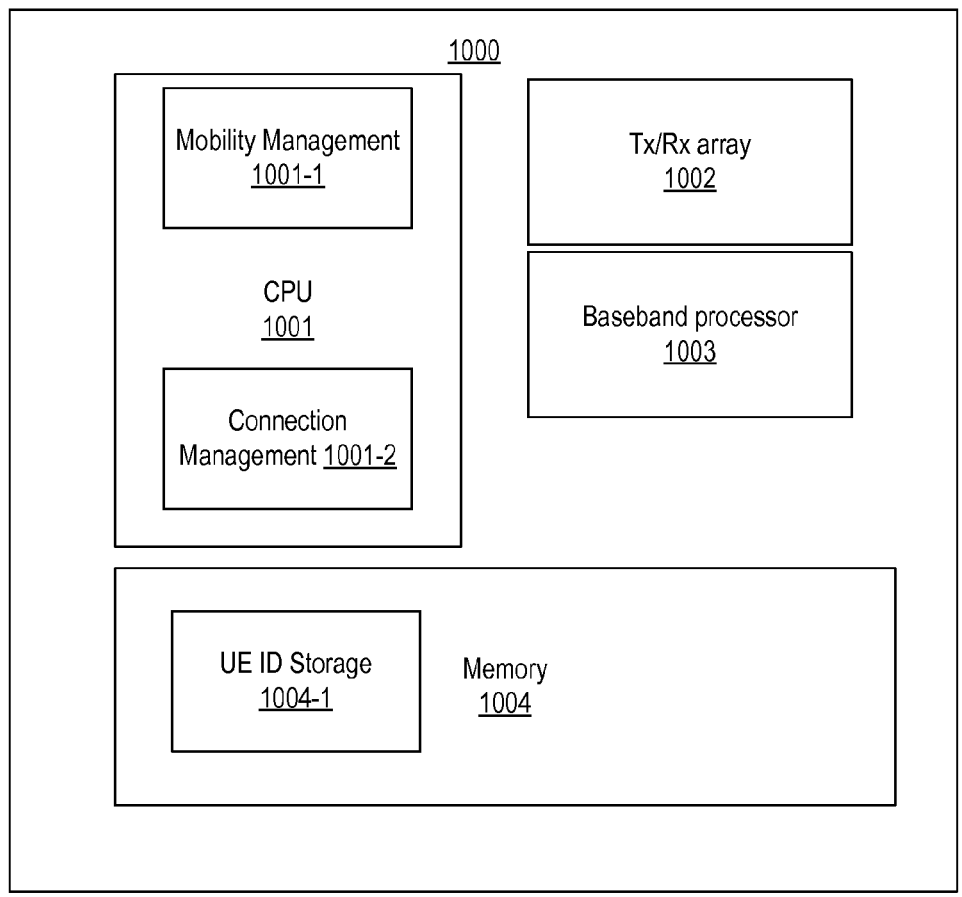
FIG. 10 illustrates an example user equipment upon which example implementations can be implemented.

FIG. 10 illustrates an example user equipment upon which example implementations can be implemented. The UE 1000 may involve the following modules: the CPU module 1001, the Tx/Rx array 1002, the baseband processor 1003, and the memory 1004. The CPU module 1001 can be configured to perform one or more functions, such as execution of the flows as described, for example, in FIGS. 4 and 6. The Tx/RX array 1002 may be implemented as an array of one or more antennas and can be configured to be in an isotropic or directional configuration. The memory 1004 can be configured to store possible steering configurations for the UE as well as the antenna response parameters for the serving base station as well as one or more base stations. The baseband digital signal processing (DSP) module 1003 can be configured to perform one or more functions, such as to conduct measurements to generate the feedback measurements associated with the position and orientation of the UE for the serving base station. The memory 1004 can be configured to store UE ID storage information 1004-1 to store the identifier of the UE. The CPU module 1001 is configured to provide the functions of mobility management 1001-1 and connection management 1001-2 that manages the signaling link with the RAN and the SGSN or the MME. Connection management 1001-2 may provide management functions to interact with the RAN 900 by using the TX/RX array 1002.

FIGS. 11(a) and 11(b) illustrate examples of target node offload information 802-2, in accordance with an example implementation. The offload information on the target MME/SGSN contains a mapping of the sequence number range to the source node identifiers, which can be used to discover the IP address of the source node. The sequence number range field specifies the sequence number range assigned to a peer source node. FIG. 11(a) illustrates an example for support node apparatuses that are SGSNs, and includes the sequence number range and the source SGSN identifier. FIG. 11(b) illustrates an example for support node apparatuses that are MMEs, and includes the M-TMSI number range and the source MME code.

FIGS. 12(a) and 12(b) illustrate an example of core Node ID Management 905-1, in accordance with an example implementation. The RAN maintains a mapping of the core network node identifiers to the core node. In a GPRS/UMTS implementation as illustrated in FIG. 12(a), the Network Resource Identifier field indicates the identifier for an SGSN. Each SGSN is assigned an NRI that is configured in the GPRS/UMTS RAN. The SGSN includes its NRI in the P-TMSI and sends to the UE during an Attach, Routing Area Update Procedure or a PTMSI Reallocation procedure. During the connection procedure the UE sends the NRI to the radio network controller (RNC) which then uses it to select the correct SGSN.

In an LTE implementation as illustrated in FIG. 12(b), for the Evolved UMTS Terrestrial Radio Access Network (E-UTRAN), each MME is assigned one or more MME Group and MME Code. Each MME provides its identity to the eNodeBs during the S1 AP Setup procedure. The eNodeB uses the stored MME identifiers during the UE connection setup procedure to route the messages to the correct MME. The MME provides the GUTI to the UE during the Attach Procedure, the Tracking Update Procedure or the GUTI Reallocation procedure. The GUTI includes the MME Group, MME Code, and M-TMSI. The UE stores the GUTI and provides the MME Identifier (MME Group and/or MME Code) to the eNodeB during the connection setup procedure. The eNodeB uses the MME Identifier to select the correct MME.

Figure 13:
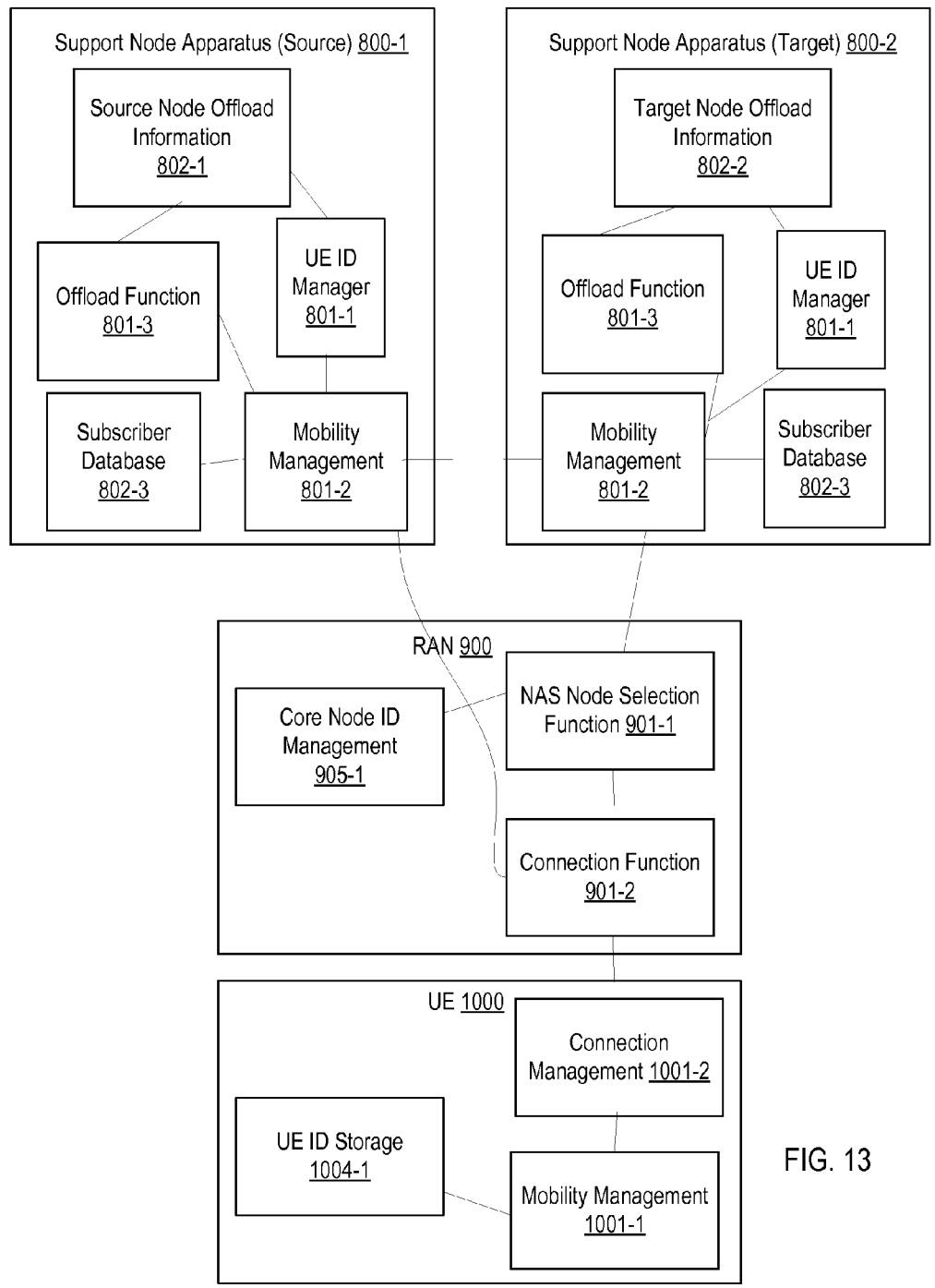
FIG. 13 illustrates an example system in accordance with an example implementation.

FIG. 13 illustrates an example system in accordance with an example implementation, which incorporates the flow of FIG. 4 and FIG. 6. In this example system, there is a support node apparatus 800-1 offloading a UE to a target support node apparatus 800-2. The operator of the support node apparatus 800-1 interacts with the interface of the offload function 801-3 to initiate load balancing. The mobility manager 801-2 interacts with the subscriber database 802-3 to determine candidates for UE offloading. The mobility manager 801-2 then obtains the UE ID and status from the UE ID manager 801-1 and the core node identifier of the target support node apparatus from 802-1.

Mobility manager 801-2 then forms a new UE identifier (PTMSI or GUTI) that uses the core node identifier and the reserved range and transmits the new UE identifier to the UE via the RAN 900. Based on the core node identifier processed in the PTMSI/GUTI, the RAN 900 forwards the ensuing message from the UE to the target support node apparatus 800-2. The NAS Node Selection Function 901-1 interacts with the mobility management function 801-2 of the target support node apparatus 800-2 to forward the UE message. Target support node apparatus 800-2 identifies the source node apparatus from target node offload operation 802-2.

Finally, some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A support node apparatus configured to support a wireless network system, the apparatus comprising:
   a memory configured to store management information indicative of a relationship between one or more identifiers and one or more other support node apparatuses in the wireless network system, the one or more identifiers being in a form of one of a network resource identifier and a globally unique temporary identifier, and the one or more identifiers comprising information indicative of how many simultaneous user equipment devices can be moved from the support node apparatus at a time; and
   a processor configured to:
   select a target support node apparatus from the one or more other support node apparatuses in the wireless network system for a user equipment;
   retrieve, from the management information stored in the memory, a target identifier from the one or more identifiers corresponding to the target support node apparatus; and
   associate the user equipment with the target identifier.

2. The support node apparatus of claim 1, wherein the processor is configured to select the target support node apparatus based on load balancing, and wherein the processor is further configured to process a request for load balancing.

3. The support node apparatus of claim 1, wherein the processor is configured to associate the user equipment with the target identifier by providing the target identifier for the user equipment to a radio access network.

4. The support node apparatus of claim 1, wherein the one or more identifiers are in the form of the network resource identifier, and wherein the support node apparatus is configured as a mobility management entity.

5. The support node apparatus of claim 1, wherein the one or more identifiers are in the form of the globally unique temporary identifier, and wherein the support node apparatus is configured as a serving general packet radio service support node apparatus.

6. The support node apparatus of claim 1, wherein the processor is further configured to:
   process a message from a radio access network, the message associated with another user equipment and an identifier associated with the support node apparatus;
   determine a source support node apparatus associated with the message from the one or more other support nodes in the wireless network system; and
   transmit a context request to the source support node apparatus.

7. A method for a support node apparatus configured to support a wireless network system, the method comprising:
   managing management information indicative of a relationship between one or more identifiers and one or more other support node apparatuses in the wireless network system, the one or more identifiers being in a form of one of a network resource identifier and a globally unique temporary identifier, and the one or more identifiers comprising information indicative of how many simultaneous user equipment devices can be moved from the support node apparatus at a time;
   selecting a target support node apparatus from the one or more other support node apparatuses in the wireless network system for a user equipment;
   retrieving, from the management information stored in the memory, a target identifier from the one or more identifiers corresponding to the target support node apparatus; and
   associating the user equipment with the target identifier.

8. The method of claim 7, further comprising processing a request for load balancing, wherein the selecting the target support node is based on the load balancing.

9. The method of claim 7, wherein the associating the user equipment with the target identifier comprises providing the target identifier for the user equipment to a radio access network.

10. The method of claim 7, wherein the one or more identifiers are in the form of the network resource identifier, and wherein the support node apparatus is configured as a mobility management entity.

11. The method of claim 7, wherein the one or more identifiers are in the form of the globally unique temporary identifier, and wherein the support node apparatus is configured as a serving general packet radio service support node apparatus.

12. The method of claim 7, further comprising:
   processing a message from a radio access network, the message associated with another user equipment and an identifier associated with the support node apparatus;
   determining a source support node apparatus associated with the message from the one or more other support nodes in the wireless network system; and
   transmitting a context request to the source support node apparatus.

13. A wireless network system comprising:
   one or more radio access networks configured to handle one or more associated user equipment; and
   one or more support node apparatuses, each of the one or more support node apparatuses comprising:

a memory configured to store management information indicative of a relationship between one or more identifiers and the one or more other support node apparatuses in the wireless network system, the one or more identifiers being in a form of one of a network resource identifier and a globally unique temporary identifier, and the one or more identifiers comprising information indicative of how many simultaneous user equipment devices can be moved from the support node apparatus at a time;

a processor configured to:
    select a target support node apparatus from the one or more other support node apparatuses in the wireless network system for a user equipment from the one or more associated user equipment;
    retrieve, from the management information stored in the memory, a target identifier from the one or more identifiers corresponding to the target support node apparatus; and
    associate the user equipment with the target identifier.

14. The wireless network system of claim 13, wherein the processor is configured to select the target support node apparatus based on load balancing, and wherein the processor is further configured to process a request for load balancing.

15. The wireless network system of claim 13, wherein the processor is configured to associate the user equipment with the target identifier by providing the target identifier for the user equipment to an associated one of the one or more radio access networks, and wherein each of the one or more radio access networks is configured to reassign the user equipment to the target support node apparatus indicated by the target identifier and transmit a message to the target support node apparatus.

16. The wireless network system of claim 13, wherein the one or more identifiers are in the form of the network resource identifier, and wherein the one or more support node apparatuses are configured as mobility management entities.

17. The wireless network system of claim 13, wherein the one or more identifiers are in the form of the globally unique temporary identifier, and wherein the one or more support node apparatuses are configured as serving general packet radio service support node apparatuses.

18. The wireless network system of claim 13, wherein the processor is further configured to:
    process a message from a radio access network from the one or more radio access networks, the message associated with another user equipment and an identifier associated with the each of the one or more support node apparatuses;
    determine a source support node apparatus associated with the message from the one or more other support nodes in the wireless network; and
    transmit a context request to the source support node apparatus.

* * * * *